(12) United States Patent  
Yasui et al.

(10) Patent No.: US 8,585,134 B2  
(45) Date of Patent: Nov. 19, 2013

(54) VEHICLE BODY LOWER STRUCTURE

(75) Inventors: Ken Yasui, Wako (JP); Yuya Furusaki, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 57 days.

(21) Appl. No.: 13/425,853

(22) Filed: Mar. 21, 2012

(65) Prior Publication Data

US 2012/0256448 A1     Oct. 11, 2012

(30) Foreign Application Priority Data

Apr. 7, 2011   (JP) ................................ 2011-085136

(51) Int. Cl.
*B62D 25/20* (2006.01)

(52) U.S. Cl.
USPC ........................................ 296/209; 296/204

(58) Field of Classification Search
USPC .......... 296/209, 203.01, 204, 203.02, 203.03
See application file for complete search history.

(56) References Cited

U.S. PATENT DOCUMENTS

| | | | |
|---|---|---|---|
| 8,366,185 B2* | 2/2013 | Herntier | 296/209 |
| 8,371,643 B2* | 2/2013 | Itakura | 296/203.03 |
| 2002/0195840 A1* | 12/2002 | Mishima et al. | 296/203.01 |
| 2003/0102697 A1* | 6/2003 | Yakata et al. | 296/209 |
| 2003/0193215 A1* | 10/2003 | Gennai et al. | 296/203.01 |
| 2009/0243343 A1* | 10/2009 | Tamakoshi | 296/204 |
| 2010/0123337 A1* | 5/2010 | Tamura et al. | 296/203.03 |
| 2012/0248825 A1* | 10/2012 | Tamura | 296/209 |
| 2013/0049407 A1* | 2/2013 | Kageyama | 296/204 |

FOREIGN PATENT DOCUMENTS

JP          2003-237636 A       8/2003

* cited by examiner

*Primary Examiner* — H Gutman
(74) *Attorney, Agent, or Firm* — Westerman, Hattori, Daniels & Adrian, LLP

(57) ABSTRACT

A vehicle includes a crush area disposed in front end part of each side sill, the crush area being crushable under a collision load upon collision in order to absorb the collision load. A bulkhead is disposed on the rear of the crush area inside the side sill. A reinforcing frame is attached to a side surface of the side sill facing a vehicle interior, one end of the reinforcing frame being joined to surface part of a portion, where the bulkhead is disposed, of the side sill such that the reinforcing frame extends rearwardly and inwardly in a vehicle width direction, the other end thereof being joined to a floor frame.

6 Claims, 11 Drawing Sheets

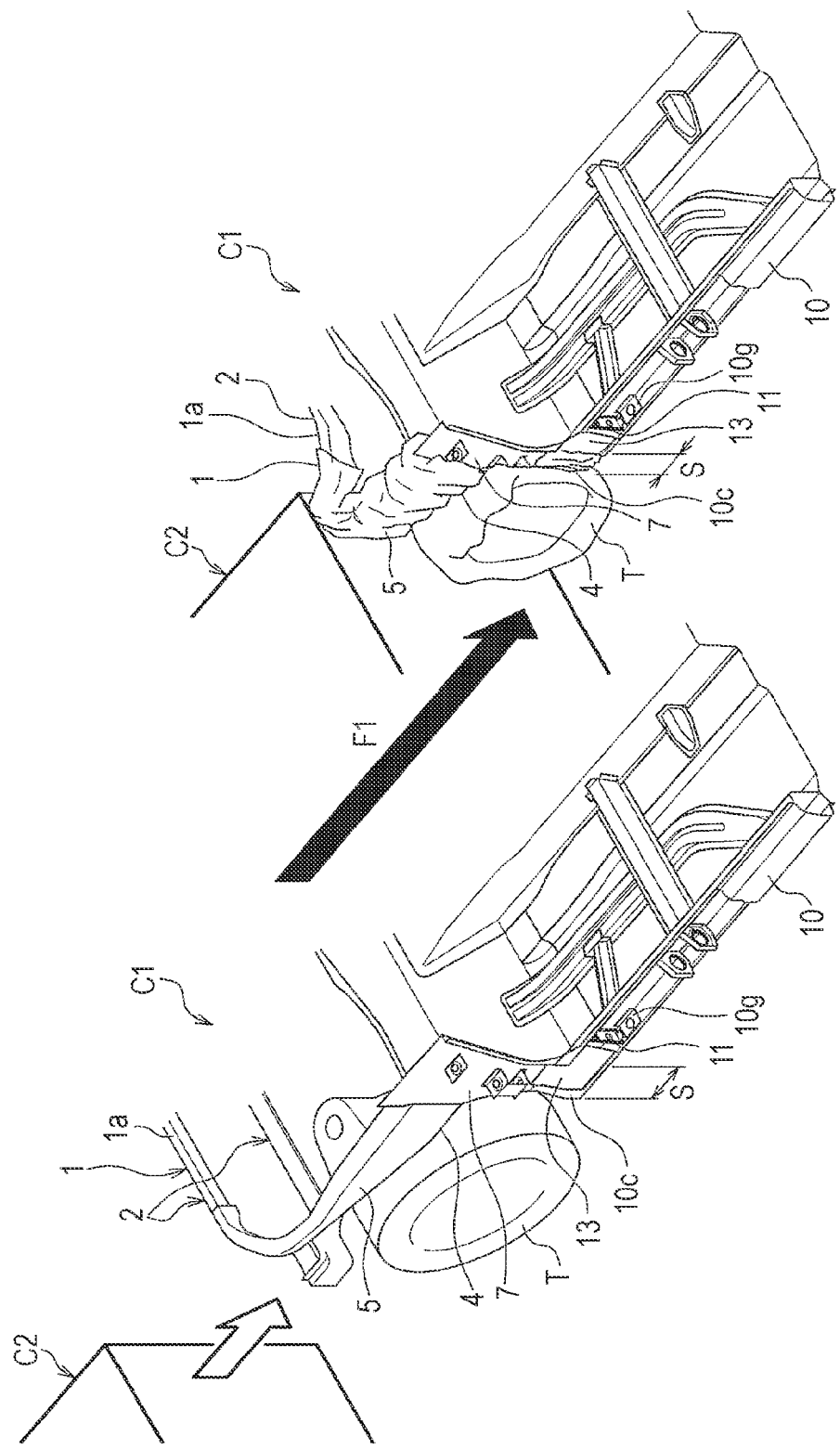

ative long and two short dashes line in FIG. 10.

VEHICLE BODY LOWER STRUCTURE

CROSS REFERENCES TO RELATED APPLICATIONS

The present application claims priority under 35 U.S.C. §119 to Japanese Patent Application No. 2011-085136 filed Apr. 7, 2011, entitled "Vehicle Body Lower Structure". The contents of this application are incorporated herein by reference in their entirety.

TECHNICAL FIELD

The present embodiment relates to vehicle body lower structures, and in particular, relates to a vehicle body lower structure with improved ability to absorb a collision load caused by a narrow offset collision in which a vehicle collides with a collision object, e.g., an oncoming vehicle, such that a rigid structure, such as a front side frame, of the oncoming vehicle strikes the front end of a side sill of the body of the vehicle while the oncoming vehicle is deviating to the right or left side of the front end of the vehicle so as to pass the vehicle at a slight distance therefrom.

BACKGROUND OF THE INVENTION

A vehicle body structure has been known which suppresses deformation of the body of a vehicle by distributing a collision load, caused by an offset collision between the vehicle and an oncoming vehicle (collision object), to increase the strength of the vehicle body (refer to, for example, Japanese Unexamined Patent Application Publication No. 2003-237636).

FIG. 10 is a schematic plan view of the vehicle body in the vehicle disclosed in Japanese Unexamined Patent Application Publication No. 2003-237636 and illustrates a state where a collision load is applied to the vehicle upon narrow offset collision. FIG. 11 is a side elevational view of essential part on the left of the vehicle disclosed in Japanese Unexamined Patent Application Publication No. 2003-237636 and illustrates a state of a door after narrow offset collision.

Referring to FIG. 10, in the vehicle structure disclosed in Japanese Unexamined Patent Application Publication No. 2003-237636, each diagonal member 500 extending from the front end of a side sill 100 rearwardly and inwardly in a direction along the width of the vehicle (hereinafter, referred to as the "vehicle width direction") is disposed so as to connect a corner at which the side sill 100 is coupled to an outer side member 200 to a corner at which a floor frame (central member) 300 is coupled to the floor cross member 400.

In this case, the diagonal member 500 prevents the side sill 100 from being inwardly bent under a collision load applied from a front wheel T upon narrow offset collision with a collision object, such as an oncoming vehicle C2.

In the related-art vehicle body structure, if a narrow offset collision occurs such that a collision object, e.g., the oncoming vehicle C2 strikes against a portion outside a front side frame 600 in the vehicle width direction as illustrated in FIG. 10, a collision load F will be applied to the front end of the side sill 100. Even if a load applied to the side sill 100 is reduced by the diagonal member 500, therefore, a large load will be applied to the side sill 100 in a direction in which a frontal collision load is applied. Consequently, the side sill 100 is bent and deformed such that it is compressed by a length L100, like a side sill 100A indicated by an alternate long and two short dashes line in FIG. 10.

In this case, a front pillar 700 coupled to an upper portion of the front end of the side sill 100 is also moved to the rear of the vehicle body in accordance with deformation of the side sill 100 as illustrated in FIG. 11, so that front attachment portions 710, included in the front pillar 700, for a door 800 are moved rearward. Unfortunately, the door 800 may become difficult to open.

In a vehicle equipped with no diagonal members 500 as illustrated in FIG. 10, since the front wheel T enters a vehicle interior while moving rearward, the side sill is bent toward the vehicle interior, like a side sill 100B indicated by another alternate long and two dashes line in FIG. 10, so that the vehicle interior is deformed.

SUMMARY OF THE INVENTION

It is therefore desirable to receive and absorb a collision load using vehicle body front part anterior to the door so that the side sill is not deformed upon narrow offset collision of the vehicle. The present embodiment provides a vehicle body lower structure that prevents a front pillar from moving to the rear of a vehicle body upon narrow offset collision in order to prevent a door from being difficult to open.

According to an aspect of the present embodiment, a vehicle body lower structure includes a side sill disposed on an end of a vehicle body in a vehicle width direction so as to extend along the length of the vehicle body, the side sill including a crush area and a bulkhead, the crush area being crushable under a collision load caused by collision with a vehicle in order to absorb the collision load, the bulkhead being disposed on the rear of the crush area inside the side sill, and a reinforcing frame attached to a side surface of the side sill facing a vehicle interior, one end of the reinforcing frame being joined to surface part of a portion, where the bulkhead is disposed, of the side sill closer to the vehicle interior such that the reinforcing frame extends rearwardly and inwardly in the vehicle width direction, the other end thereof being joined to a floor frame.

In the vehicle body lower structure with the above configuration, when a narrow offset collision between the vehicle and a collision object occurs, the side sill is pressed by, for example, a wheel which is positioned in front of the side sill and is moved rearward under a collision load, and the crush area, which is positioned on the front of a junction between the side sill and the reinforcing frame and which has a low strength, is crushed, thus absorbing the collision load. In the side sill, since the bulkhead increases the cross-sectional stiffness of the rear end of the crush area to prevent the cross-sectional shape of the side sill from being broken (or crushed), the collision load applied to the front end of the side sill can be concentrated on the crush area such that the crush area is more easily crushed, thus increasing the ability to absorb the collision load. Consequently, if a narrow offset collision between the vehicle and a collision object occurs, crushing the crush area in the front end of the side sill will be locally facilitated, thus providing good ability to absorb a collision load.

Furthermore, since the surface part of the portion, where the bulkhead is disposed, of the side sill closer to the vehicle interior is supported by the reinforcing frame joined to the inner side of the side sill in the vehicle width direction such that the side sill is prevented from being deformed inwardly to the vehicle interior, the side sill is not bent inwardly to the vehicle interior. This prevents a front pillar from being moved rearward and also prevents the shape of a door opening and that of the vehicle interior from being deformed.

As a result, since the crush area absorbs a collision load caused by collision of the vehicle, part of the side sill on the rear of the crush area is prevented from being bent, thus preventing a door from being difficult to open due to deformation of the door opening above the side sill. The door can be opened and closed after collision while the shape of the door opening is being kept.

Since one end of the reinforcing frame is connected to the side sill and the other end thereof is joined to the floor frame such that the reinforcing frame extends between the side sill and the floor frame, the reinforcing frame securely supports a floor surface in the vehicle interior, thus preventing vibration of the floor surface.

Preferably, the side sill includes a side sill inner disposed inside the vehicle body and a side sill outer disposed on the outside of the vehicle body such that the side sill inner and the side sill outer are joined to each other, the bulkhead is coupled to the side sill inner having an upper inner surface, a side inner surface, and a lower inner surface such that the bulkhead is joined to the three inner surfaces, and a separating portion of the bulkhead which separates a space within the side sill into front and rear parts is disposed on an extension of a load transfer path of a load transfer portion included in the reinforcing frame.

With this configuration, the side sill inner is made of high-strength steel sheet in order to protect the vehicle interior against collision, thus increasing a reaction force against a collision load. The bulkhead joined to the three inner surfaces of the side sill inner prevents the cross-sectional shape of the side sill inner on the rear of the crush area from being deformed. Since a collision load applied to a front wheel is linearly transferred through the bulkhead along the load transfer path of the load transfer portion of the reinforcing frame and is received by the floor frame, the load applied to the crush area in front of the bulkhead can be increased, thus increasing impact absorbing performance.

Preferably, the load transfer portion is an edge line defined by the upper surface and a side surface of the reinforcing frame.

With this configuration, since the edge line defined by the upper and side surfaces of the reinforcing frame serves as the reinforced load transfer portion and the bulkhead is disposed on the extension of the load transfer path of the load transfer portion, serving as the edge line, to support the side sill inner, the reinforcing frame can prevent the side sill from being deformed and bent due to a collision load caused upon narrow offset collision.

Preferably, the reinforcing frame extends along a floor surface and the cross-sectional centroid of the side sill is positioned on an approximate extension of the edge line.

With this configuration, since the reinforcing frame extends along the floor surface and the centroid of the side sill is disposed on the extension of the edge line, the reinforcing frame can receive a collision load caused upon narrow offset collision, thus increasing the ability to transfer the collision load. Furthermore, the reinforcing frame is curved along the floor surface, so that the lower surface of the reinforcing frame can be fitted to irregularities of the floor surface. Accordingly, the floor surface can be shaped so as to have a larger recess than a floor surface of a typical vehicle. The floor frame can be disposed in the recess such that the lower surface of the floor is flattened. Consequently, resistance to air flowing along the lower surface of the floor can be reduced.

Preferably, a floor panel forming the floor surface is coupled to the lower surface of the side sill inner.

With this configuration, since the floor panel is coupled to the lower surface of the side sill inner, the height of the reinforcing frame formed along the floor surface can be increased by placement of the floor panel on the lower surface of the side sill. Advantageously, the cross-sectional area of the reinforcing frame is increased, thus increasing the strength.

Preferably, the floor frame and the reinforcing frame are arranged on the lower surface of the floor panel.

With this configuration, the floor panel, serving as the upper surface of the floor, can be supported flat by arrangement of the floor frame and the reinforcing frame on the lower surface of the floor, thus preventing vibration of the floor panel.

Preferably, the vehicle body lower structure includes a jack-up reinforcement plate disposed in the crush area, the jack-up reinforcement plate being resistant to a load acting along the height of the vehicle body and being sensitive to a load acting along the length of the vehicle body.

With this configuration, disposing the jack-up reinforcement plate allows the crush area to have jack-up support strength, which permits reception of a load acting along the height of the vehicle body during use of a jack, and crushability (impact absorbability) under a collision load acting along the length of the vehicle body upon narrow offset collision. Thus, these functions can be improved.

According to the present embodiment, the vehicle body lower structure permits the front end part of the side sill to absorb a collision load caused upon narrow offset collision in order to prevent bending the side sill disposed under the door opening so that the door can be opened and closed.

BRIEF DESCRIPTION OF THE DRAWINGS

The advantages of the invention will become apparent in the following description taken in conjunction with the drawings, wherein:

FIG. 8A is a perspective view of part of the vehicle body lower structure according to the embodiment, FIG. 8A illustrating a state before collision of the vehicle;

FIG. 8B is a perspective view thereof, FIG. 8B illustrating a state upon narrow offset collision of the vehicle;

DESCRIPTION OF THE PREFERRED EMBODIMENTS

A vehicle body lower structure according to an embodiment of the present disclosure will be described with reference to FIGS. 1 to 8B. In the following description, the forward traveling direction of a vehicle C1 will be called "front", the rearward traveling direction will be called "rear", the vertical upward direction will be called "upper", the vertical downward direction will be called "lower", and directions along the width of the vehicle will be called "left" and "right".

Vehicle

Figure 1:
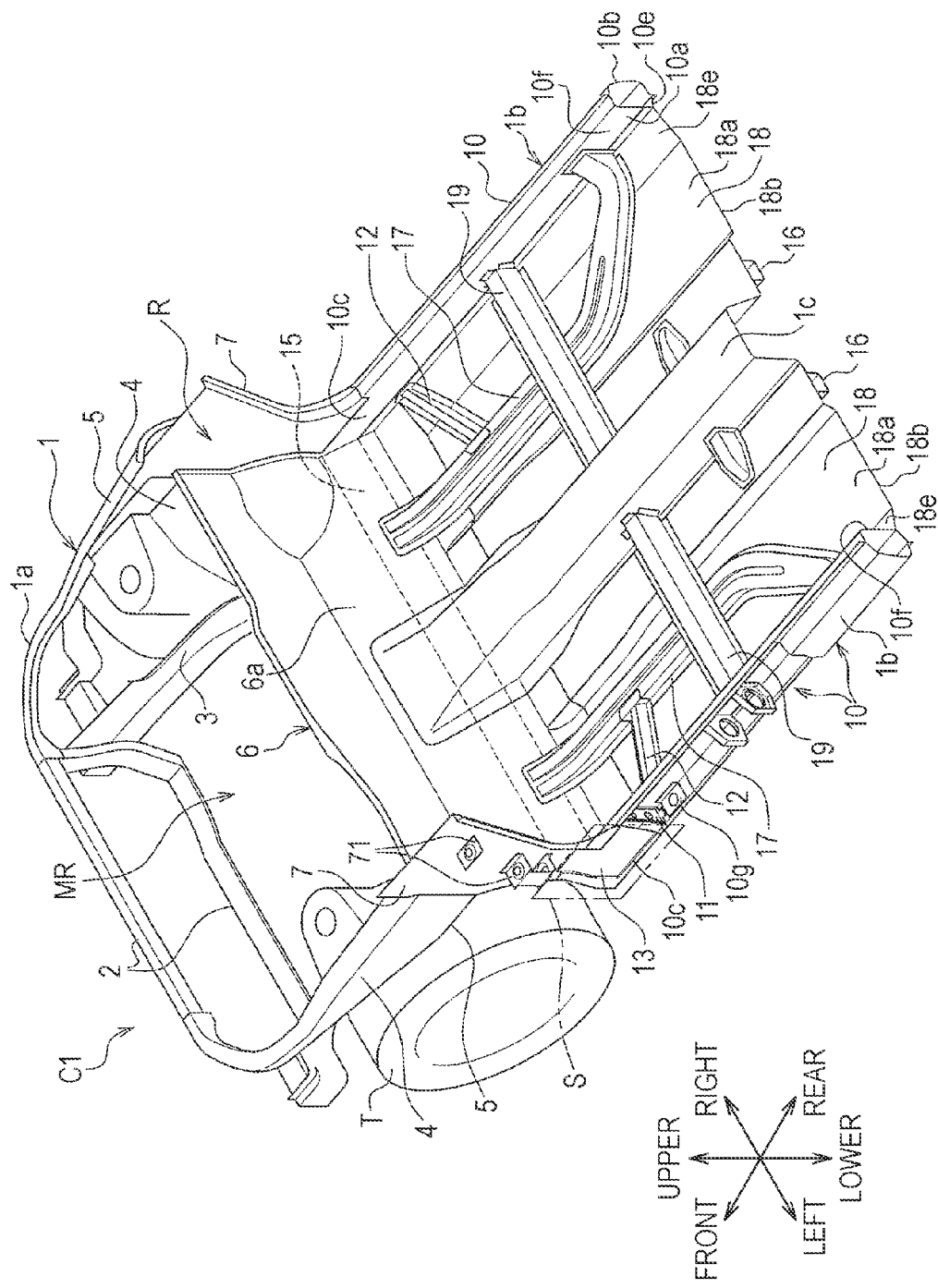
FIG. 1 is a perspective view of part of a vehicle body, FIG. 1 illustrating a vehicle body lower structure according to an embodiment of the present disclosure.

An example of the vehicle C1 to which the present embodiment is applied will be described prior to description of the vehicle body lower structure according to the embodiment of the present disclosure. Referring to FIG. 1, the vehicle C1 is a car which includes a motor room MR in vehicle body front part 1a and a vehicle interior (cabin) R disposed adjacent to the motor room MR, with a partition 6 therebetween. For example, the vehicle C1 is a passenger automobile, such as a front-engine rear-drive (FR) car or a four-wheel drive car. The vehicle C1 includes a pair of right and left side sills 10 arranged on outer right and left sides of a vehicle body 1 and floor frames 17 arranged closer to the center of the vehicle body 1 than the side sills 10. So long as the vehicle C1 includes the side sills and the floor frames arranged as described above, the type and kind are not particularly limited. The present embodiment will be described below with respect to an FR car.

Vehicle Body

Referring to FIG. 1, the vehicle body 1 forms the whole of the vehicle C1 and mainly includes various metal vehicle body frames, such as the side sills 10, the floor frames 17, and front side frames 3, a hood (not illustrated), a metal vehicle body panel, such as a fender panel, and bumper faces (not illustrate) made of resin or metal.

In the vehicle body front part 1a and vehicle body lower part 1b of the vehicle body 1, for example, a front bulkhead 2, a bumper beam (not illustrated), the front side frames 3, front wheel house upper members 4, front wheel houses 5, the partition 6, front pillars 7, the side sills 10, reinforcing frames 12, the floor frames 17, jack-up reinforcement plates 13, outriggers (not illustrated), a front cross member 15, and tunnel frames 16 are generally symmetrically arranged such that each pair of right and left components extend along the length of the vehicle body 1 and each single component extends in the vehicle width direction. The above components will be described later.

As described above, since the vehicle body lower part 1b has generally symmetrical configuration, left part of the vehicle body 1 will be mainly described below and explanation of right part thereof will be omitted as appropriate.

Motor Room

The motor room MR is a storage space in which a power unit (not illustrated) including, for example, an electric motor or an engine and a transmission is disposed. The motor room MR is formed by frames and panel members arranged so as to surround the storage space. The front bulkhead 2 and the bumper beam (not illustrated) are arranged on the front of the motor room MR. The partition 6 and the front cross member 15 are arranged on the rear thereof. The front bulkhead 2, the front wheel house upper members 4, the front wheel houses 5, and the front pillars 7 are arranged on the upper right and left of the motor room MR. The pair of front side frames 3 extending along the length of the vehicle body 1 are arranged on the lower right and left of the motor room MR.

Front Bulkhead

Referring to FIG. 1, the front bulkhead 2 is a frame member shaped so as to surround a radiator (not illustrated) on the front of the vehicle body 1 in the motor room MR. The front bulkhead 2 generally extends in the vehicle width direction. The bumper beam (not illustrated) is disposed in front of the front bulkhead 2.

Front Side Frames

Figure 2:
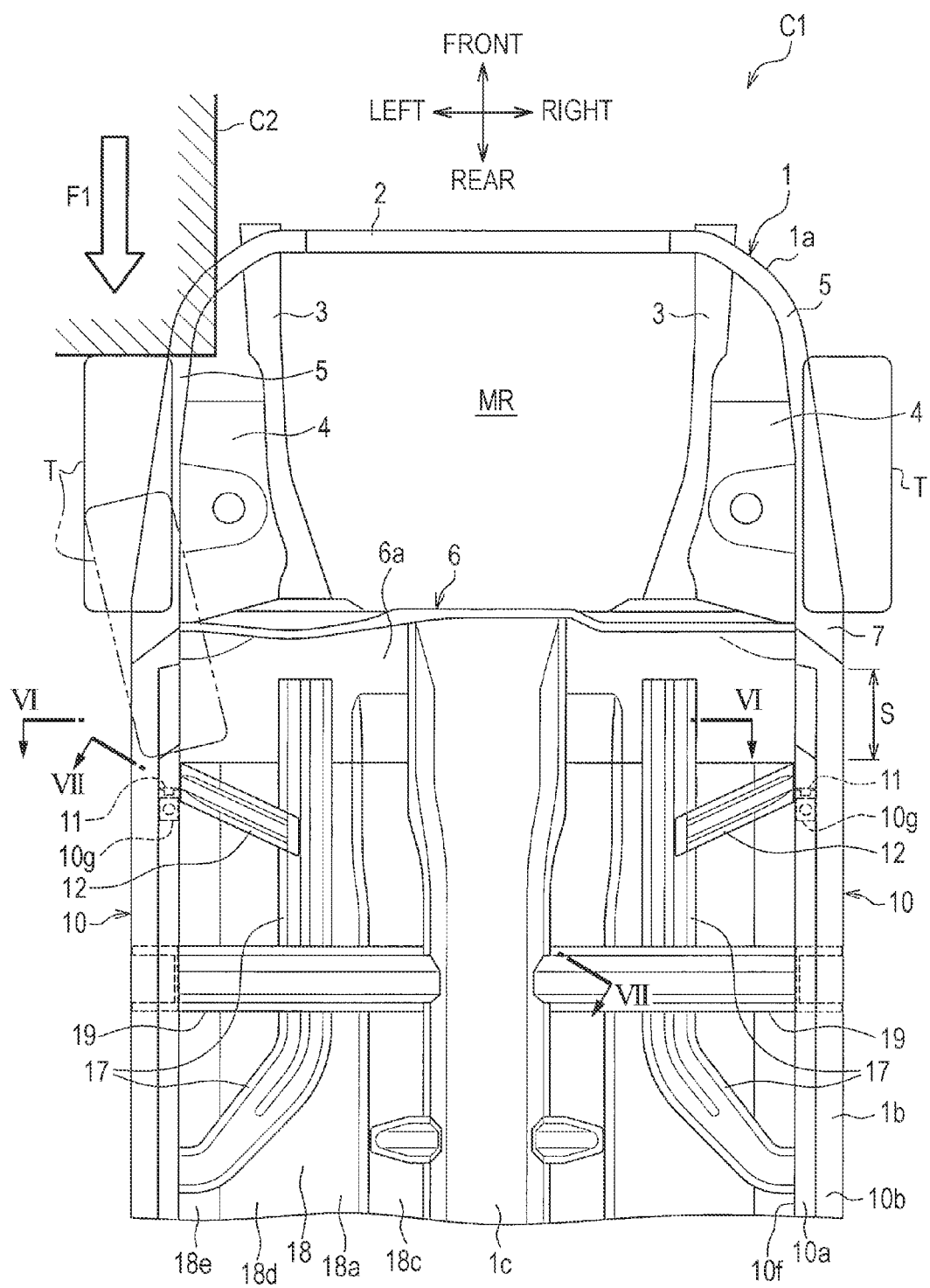
FIG. 2 is a plan view of part of the vehicle body upon narrow offset collision of a vehicle, FIG. 2 illustrating the vehicle body lower structure according to the embodiment.

Referring to FIG. 2, the front side frames 3 are a pair of right and left frame members, arranged in the vehicle body front part 1a, extending along the length of the vehicle body 1. The front side frames 3 are formed by, for example, steel square pipes, each of which has a generally rectangular cross section and is rigid from the front end to the rear end. The bumper beam (not illustrated) is connected to the front ends of the front side frames 3 with bumper beam extensions (not illustrated). The pair of right and left front side frames 3 are shaped such that front parts of the frames extend along the length of the vehicle body 1 in parallel to each other and rear parts thereof are curved inwardly so as to make the distance between the rear ends of the frames narrower than that between the front ends thereof. The rear ends of the front side frames 3 are connected to the floor frames 17. The front cross member 15 and the partition 6 are arranged between the front side frames 3.

Front Wheel House Upper Members and Front Wheel Houses

Each front wheel house upper member 4 is a frame member disposed in an upper side portion of the motor room MR so as to extend along the length of the vehicle body 1. The front end of the front wheel house upper member 4 is coupled to an upper side portion of the front bulkhead 2, the rear end thereof is coupled to the front pillar 7, and lower part thereof is coupled to the front wheel house 5. The front wheel house 5 is a panel member disposed so as to cover a side portion of the front wheel T closer to the vehicle body 1, front and rear portions thereof, and an upper portion thereof with spacing therebetween.

Partition

Referring to FIG. 1, the partition 6 is a plate member separating the motor room MR from the vehicle interior R and includes, for example, a dashboard body (not illustrated) made of a steel sheet, a dashboard lower part 6a whose right and left ends are joined to inner side surfaces of the side sills 10, a dashboard member formed by a frame member, and a reinforcing frame.

Front Pillars

The front pillars 7 are frame members extending from front end parts 10c (crush areas S) of the respective side sills 10 arranged in the vehicle body lower part 1b to right and left ends of a windshield (not illustrated) disposed above. A pair of upper and lower door hinge attachment stiffeners 71 openably supporting a front side door (not illustrated) are arranged in each front pillar 7. The door hinge attachment stiffeners 71 are metal reinforcing members which reinforce the front pillar 7, prevent the front pillar 7 from being deformed toward the door by a collision load F1 upon collision of the vehicle C1, and thus prevent the front side door from digging into a center pillar (not illustrated).

Side Sills

Referring to FIGS. 1 and 2, each side sill 10 is a hollow frame member which extends from the lower end of the front pillar 7 along the length of the vehicle body 1 in parallel to an outer end portion of a floor panel 18 in the vehicle width direction and which has a generally rectangular cross section (i.e., a shape having a closed cross section) and which is made of metal plate, such as a steel sheet. The side sill 10 includes a side sill inner 10a disposed inside the vehicle body 1 and a side sill outer 10b disposed on the outside of the vehicle body 1 such that the side sill inner 10a and the side sill outer 10b are joined to each other so as to form a closed cross section. The side sill inner 10a has a generally U-shaped cross section and is made of a high-strength steel sheet. The side sill outer 10b has a generally U-shaped cross section. The crush area S and the jack-up reinforcement plate 13 are positioned in a front portion of the front end part 10c of the side sill 10. A bulkhead 11 and a side-sill reinforcing bracket 10g are arranged inside the side sill 10 on the rear of the crush area S and the jack-up reinforcement plate 13. The front end of the front end part 10c is coupled to the rear part of the front side frame 3 with the outrigger (not illustrated). Furthermore, the bulkhead 11 is disposed inside the front end part 10c of the side sill 10 on the rear of the crush area S, which will be described later, so as to separate the space within the side sill 10 into front and rear parts. The front cross member 15, the outrigger (not illustrated), and the reinforcing frame 12 which are arranged in the vehicle width direction are joined to a side surface 10f of each side sill 10 closer to the vehicle interior R, thus holding the right end of one floor panel 18 and the left end of the other floor panel 18.

Bulkheads

Figure 3:
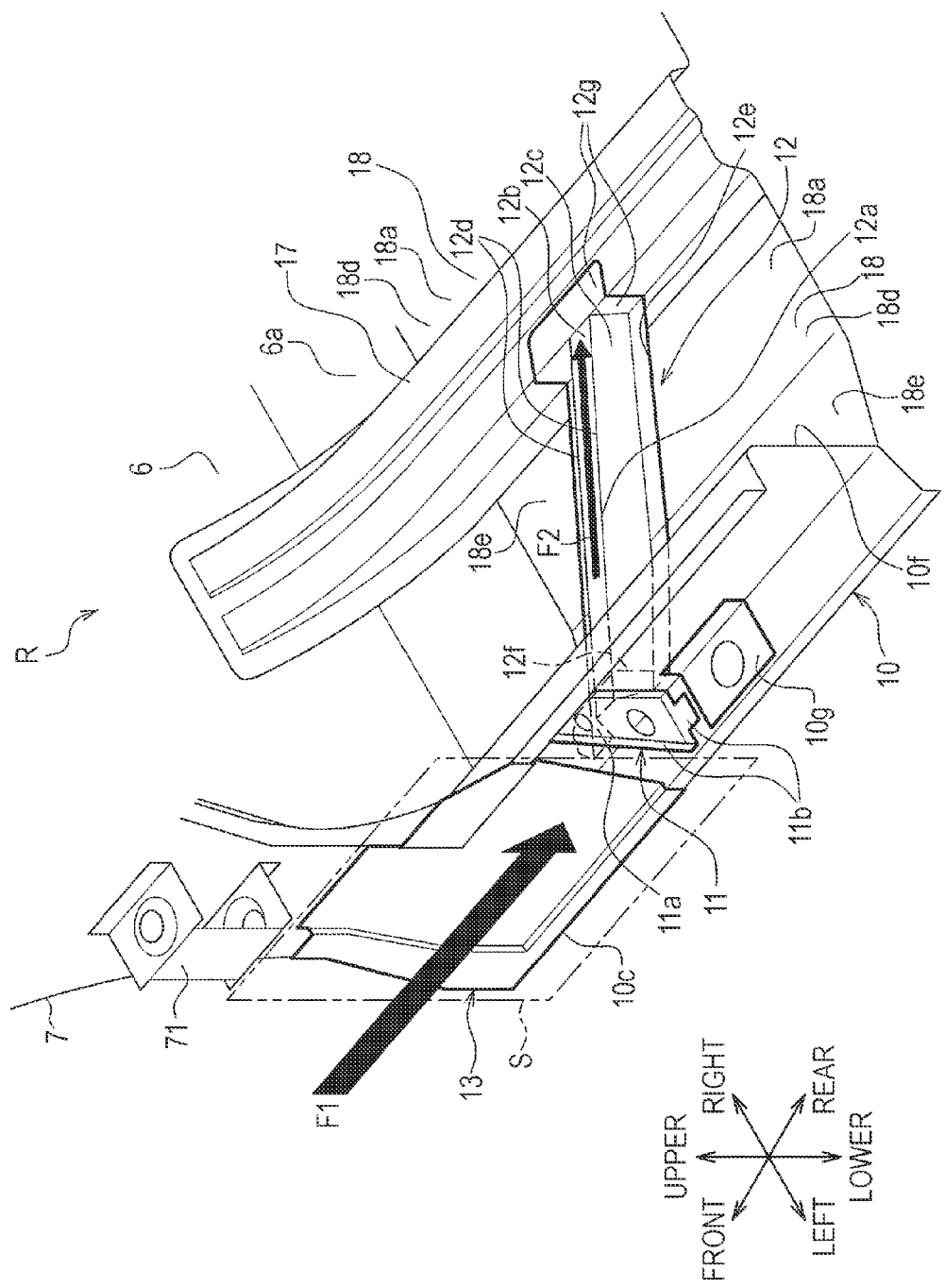
FIG. 3 is a perspective view of part of the vehicle body, FIG. 3 illustrating the vehicle body lower structure according to the embodiment and arrangement of a reinforcing frame and a bulkhead.
Figure 4:
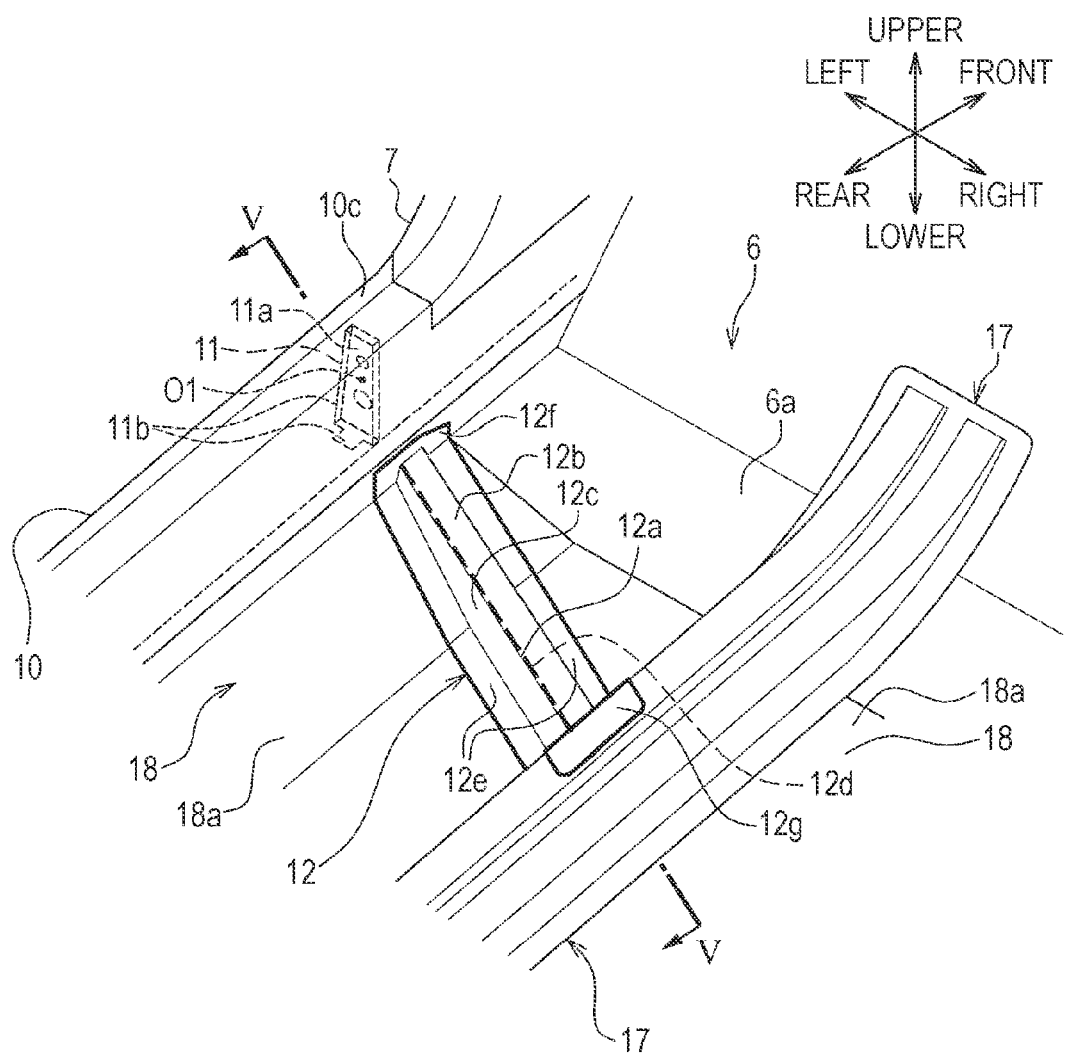
FIG. 4 is a perspective view of part of the vehicle body, FIG. 4 illustrating the vehicle body lower structure according to the embodiment and placement of the reinforcing frame.

Referring to FIGS. 3 and 4, each bulkhead 11 is a reinforcing member to reinforce the front end part 10c of the side sill 10 on the rear of the crush area S. The bulkhead 11 is made of a metal plate and is disposed so as to form a node in the side sill 10. The bulkhead 11 is provided in order to prevent the side sill inner 10a (refer to FIG. 6) from being crushed, in particular, upon a narrow offset collision such that the side sill inner 10a having a U-shaped cross section is opened or dented. The bulkhead 11 includes a separating portion 11a disposed so as to separate a space within the side sill inner 10a into front and rear parts and a flange 11b extending from the outer periphery of the separating portion 11a.

The bulkhead 11 is disposed on an extension of an edge line 12d of the reinforcing frame 12 as viewed in plan to provide a function of concentrating the collision load F1 on the crush area S upon narrow offset collision while supporting the side sill inner 10a on the side closer to the vehicle interior R to prevent the cross-sectional shape of the side sill inner 10a from being deformed under the collision load F1, and a function of transferring the collision load F1 applied to the side sill 10 to the reinforcing frame 12 to distribute the applied load.

The separating portion 11a is disposed so as to separate the space within the side sill inner 10a, which is hollow, into front and rear parts. The separating portion 11a is positioned perpendicular to an inner wall of the side sill inner 10a, which forms half of the side sill 10 closer to the vehicle interior R and extends along the length of the vehicle body 1, thus increasing the strength of the side sill inner 10a. A portion, where the bulkhead 11 is disposed and whose strength is increased by the separating portion 11a, of the side sill inner 10a is therefore hard to deform, thus increasing the efficiency of transfer of the collision load F1 from the side sill 10 to the reinforcing frame 12.

The flange 11b serves as a part to be welded to the U-shaped inner wall of the side sill inner 10a having an upper inner surface, a lower inner surface, and a side inner surface such that the flange 11b is joined to the three inner surfaces. The centroid O1 is the central point of the side sill 10 in cross section taken in the vehicle width direction.

Crush Areas

Referring to FIG. 3, each crush area S is formed so as to absorb the collision load F1 while being crushed under the collision load F1 upon collision between the vehicle C1 and the oncoming vehicle C2 (refer to FIG. 2). The crush area S is provided such that the strength of the front end part 10c positioned on the front of a connection point, at which the reinforcing frame 12 is connected to the side sill 10, rearwardly away from the front end of the side sill 10 by a predetermined distance is less than the combined strength of the side sill 10 on the rear of the connection point and the reinforcing frame 12. The range of the crush area S along the length of the vehicle body 1 extends from the portion (connection point), where the bulkhead 11 is disposed, of the side sill 10 to the front end of the side sill 10 and the range thereof along the height of the vehicle body 1 extends from the lower end of the side sill 10 to the upper end thereof. In the crush area S, the jack-up reinforcement plate 13 is disposed which reinforces a portion where a jack (not illustrated) used to raise the vehicle body 1 is set.

Jack-up Reinforcement Plates

Referring to FIG. 3, each jack-up reinforcement plate 13 is made of metal plate which is resistant to a load acting along the height of the vehicle body 1 by, for example, placement of a bead along the height of the vehicle body 1 and which is sensitive to a load acting along the length of the vehicle body 1 such that the jack-up reinforcement plate is crushable upon a narrow offset collision. Referring to FIG. 3, the jack-up reinforcement plate 13 is joined to the side sill 10 and the front pillar 7 so as to cover a side surface of the front end part 10c of the side sill 10 further from the vehicle interior and the lower end of the front pillar 7.

Reinforcing Frames

Referring to FIG. 3, each reinforcing frame 12 is a reinforcement frame member which receives the collision load F1 while holding the side surface 10f of the side sill 10 closer to the vehicle interior R in order to prevent the side sill 10 from being deformed and bent inwardly upon a narrow offset collision between the vehicle C1 and the oncoming vehicle C2 (refer to FIG. 2). The reinforcing frame 12 is made of a steel sheet and is generally hat-shaped in cross section by press bending.

The reinforcing frame 12 includes a load transfer portion 12a to transfer a collision load F2 applied to one end (outer joint 12f) of the reinforcing frame 12 to the other end (inner joint 12g) and has a horizontally flat upper surface 12b, side surfaces 12c downwardly extending from both side edges of the upper surface 12b, and the edge lines 12d each corresponding to the bent boundary between the upper surface 12b and the side surface 12c. The reinforcing frame 12 further includes flanges 12e horizontally extending from the lower ends of the side surfaces 12c, the outer joint 12f joined to the side surface 10f of the side sill 10 closer to the vehicle interior R, and the inner joint 12g joined to the upper surface of the floor frame 17.

Figure 5:
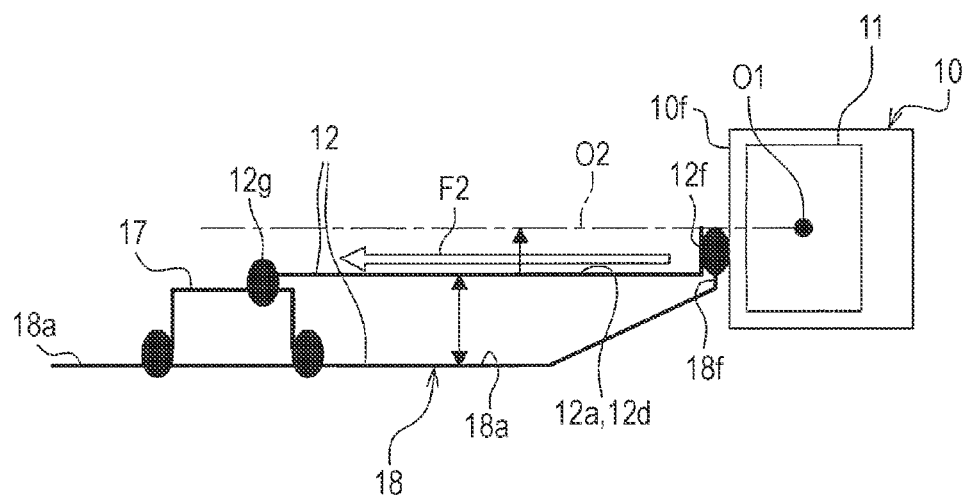
FIG. 5 is an enlarged cross-sectional view taken along the line V-V of FIG. 4.

Referring to FIGS. 3 to 5, the one end of the reinforcing frame 12 is joined to surface part 10d (refer to FIGS. 6 and 7) of the portion, where the bulkhead 11 is disposed, of the side sill 10 closer to the vehicle interior R. The reinforcing frame 12 extends rearwardly and inwardly in the vehicle width direction from such a junction. The other end of the reinforcing frame 12 is joined to the floor frame 17.

Referring to FIGS. 3 and 4, the load transfer portion 12a, which includes either or both of the edge lines 12d of the bent reinforcing frame 12, is a part whose strength is increased by the bent boundary between the upper surface 12b forming the edge line 12d and the side surface 12c positioned on each side of the upper surface 12b in the longitudinal direction thereof. Referring to FIGS. 4 and 5, the load transfer portion 12a is disposed such that an approximate extension of a load transfer path extends below the centroid O1 of the side sill 10 in this embodiment. It is desirable that the extension pass through the centroid O1 from the viewpoint of load transfer.

The upper surface 12b is flat so as to be flush with the upper surface of the floor frame 17. The side surfaces 12c downwardly extend from the side edges of the upper surface 12b so as to slightly diverge from each other.

The edge lines 12d are reinforcing parts bent at an approximately right angle to increase the strength of the reinforcing frame 12. The edge lines 12d are arranged on both sides of the upper surface 12b so as to extend along the length of the upper surface 12b. The flanges 12e are portions shaped so as to fit a floor surface 18a such that each flange extends on floor recessed part 18d (refer to FIG. 6), which is below floor raised part 18c of the floor panel 18, and floor inclined part 18e. The flanges 12e are arranged on and joined to the floor surface 18a.

The outer joint 12f is a portion bent at an approximately right angle such that the outer end of the reinforcing frame 12 further from the vehicle interior abuts against the side surface 10f of the side sill 10 while fitting the side surface 10f. The outer joint 12f is joined to the side surface 10f.

The inner joint 12g is a portion bent such that the inner end of the reinforcing frame 12 closer to the vehicle interior abuts against the side and upper surfaces of the floor frame 17 while fitting the side and upper surfaces. The inner joint 12g is joined to the side and upper surfaces of the floor frame 17.

Front Cross Member

Referring to FIG. 1, the front cross member 15 is a transversely extending member disposed between the right and left side sills 10 and has a generally hat-shaped cross section such that it has a lower opening. The front cross member 15 is made of a metal thick plate, such as a rigid steel sheet. The front cross member 15 is called "dash lower cross member" or "dashboard cross member". The front cross member 15 includes flanges for junction and reinforcement in the front and rear lower ends and the right and left ends. The front cross member 15 is disposed so as to extend in the vehicle width direction such that the junction flanges (not illustrated) in the right and left ends are joined to the inner side surfaces 10f of the side sills 10 and the lower junction flanges (not illustrated) are joined to the dashboard lower part 6a.

Floor Cross Members

Referring to FIGS. 1, 2, 6, and 7, floor cross members 19 are arranged such that one floor cross member extends between the right side sill 10 and tunnel part 1c and the other floor cross member extends between the left side sill 10 and the tunnel part 1c. Each floor cross member 19 is a generally hat-shaped cross-section frame member made of a steel sheet. The floor cross member 19 is disposed orthogonal to the floor frame 17 such that the floor frame 17 extends under the middle of the floor cross member 19 in the vehicle width direction.

Tunnel Frames

Figure 6:
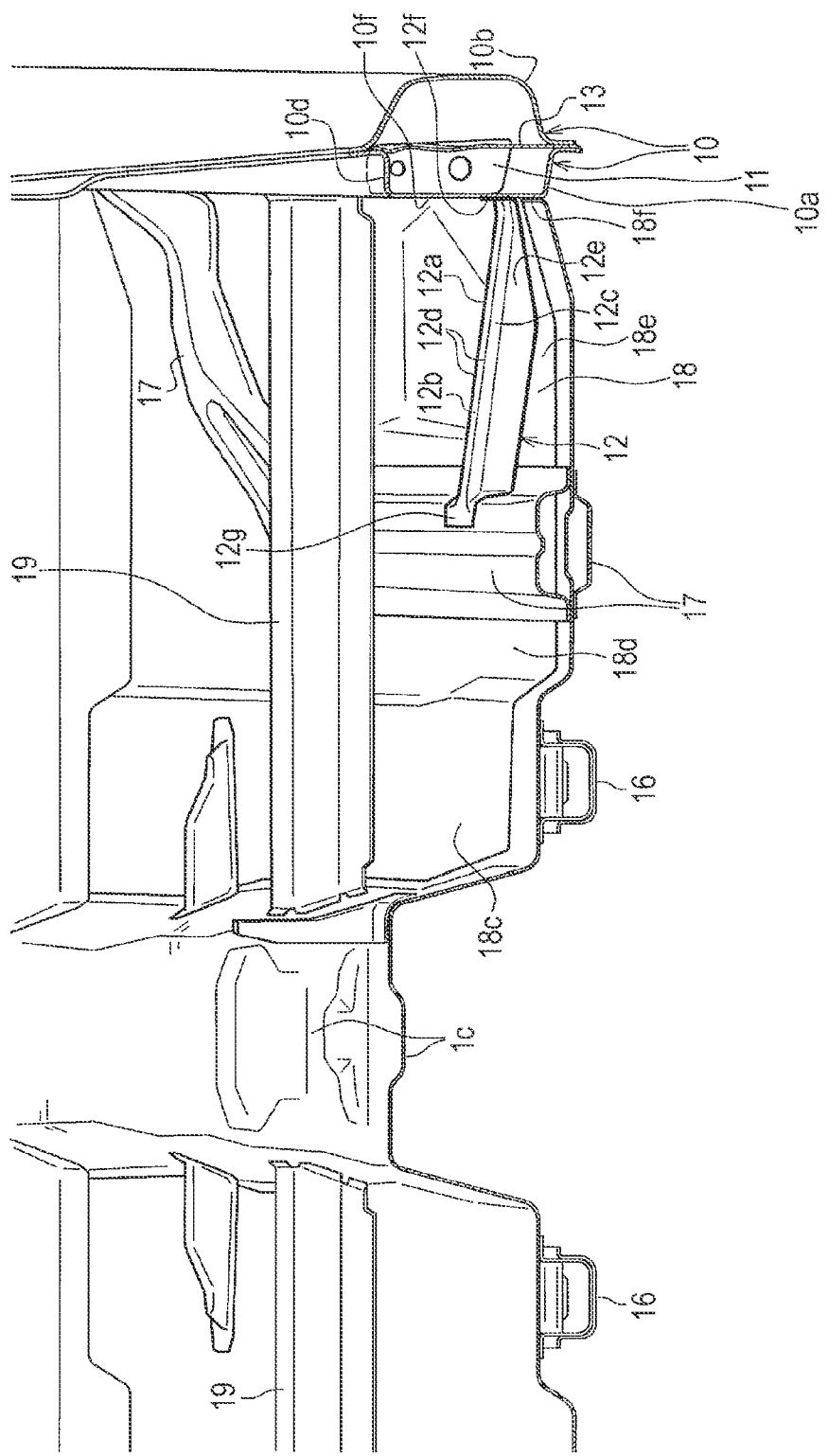
FIG. 6 is an enlarged cross-sectional view taken along the line VI-VI of FIG. 2.

Referring to FIG. 6, the tunnel frames 16 are arranged so as to extend along the length of the vehicle body 1 in right and left ends of the tunnel part 1c disposed in the middle of the floor in the vehicle interior R in the vehicle width direction. Each tunnel frame 16 is a generally hat-shaped cross-section member made of a metal plate. The two right and left tunnel frames 16 have strength increased by arrangement of a tunnel cross member and another cross member (which are not illustrated) and securely support the floor frames 17, the outriggers (not illustrated), and the partition 6 (refer to FIG. 1) arranged in front end parts of the tunnel frames 16.

Floor Frames

Referring to FIGS. 1 and 2, the floor frames 17 are generally hat-shaped cross-section frame members for holding the floor panels 18 constituting the floor of the vehicle body 1. The floor frames 17 are joined to the floor panels 18 such that the upper and lower floor frames 17 sandwich the same portion of the floor panel 18 on each of the right and left of the vehicle body 1 (refer to FIGS. 6 and 7). Accordingly, the floor frames 17 can hold the floor panels 18 such that the floor surfaces 18a are kept flat. The front ends of the floor frames 17 are connected to the rear parts of the front side frames 3. Parts of the upper floor frames 17 closer to the middle of the vehicle body 1 in the vehicle width direction are coupled to the inner joints 12g of the reinforcing frames 12 and the lower surfaces of the floor cross members 19. Rear parts of the floor frames 17 are outwardly bent and the rear ends thereof are joined to the side surfaces 10f of the right and left side sills 10 closer to the vehicle interior R.

Floor Panels

Figure 7:
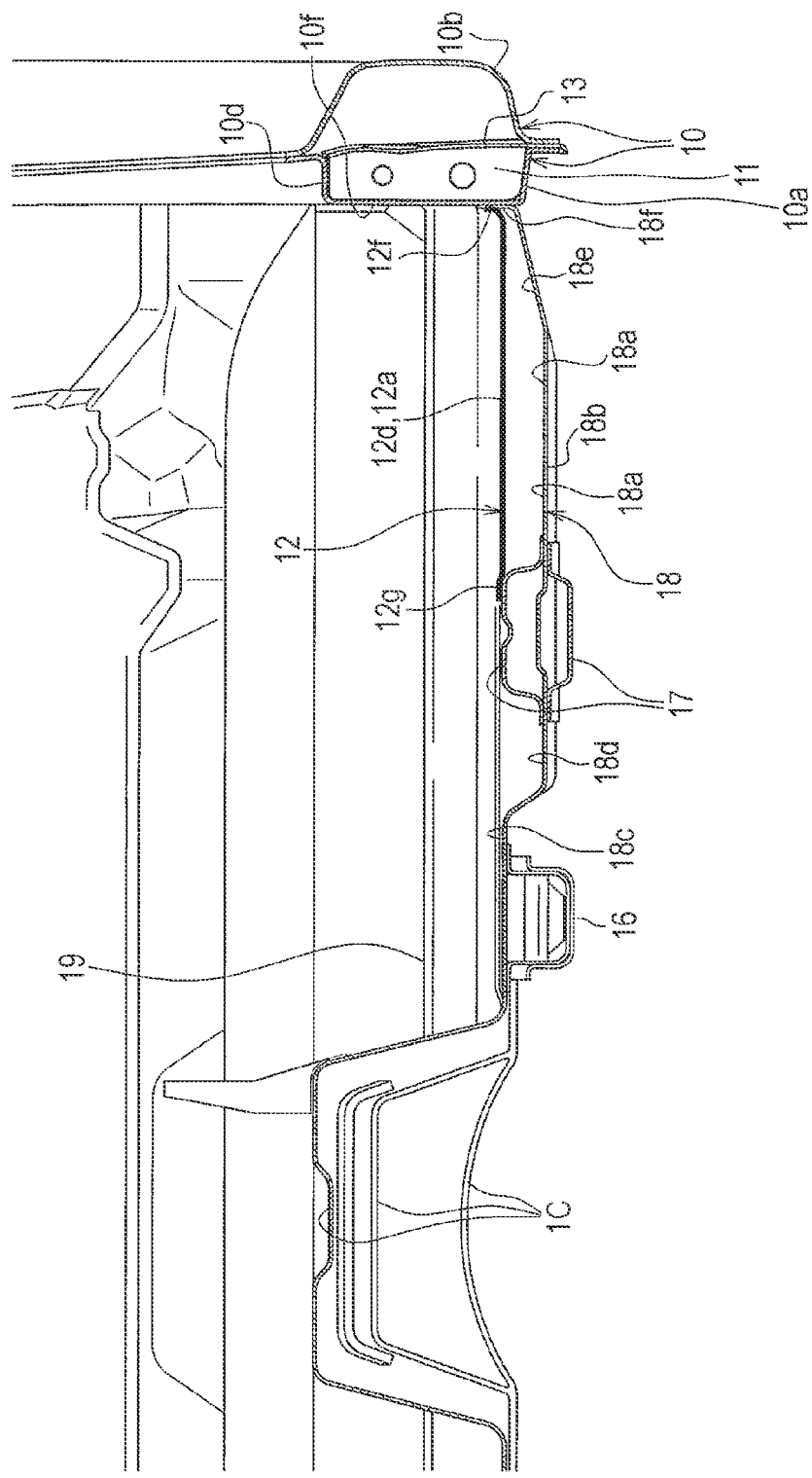
FIG. 7 is an enlarged cross-sectional view taken along the line VII-VII of FIG. 2.

Referring to FIGS. 6 and 7, the floor panels 18 are metal plate members forming the floor surfaces 18a in the vehicle interior R and each extend between the tunnel part 1c and the corresponding side sill 10. The floor surface 18a of each floor panel 18 includes the floor raised part 18c adjacent to the tunnel part 1c in the middle of the vehicle body 1 in the vehicle width direction, the floor recessed part 18d positioned below the floor raised part 18c, and the floor inclined part 18e upwardly diagonally extending from the floor recessed part 18d. The tunnel frame 16 is attached to a lower surface 18b of the floor panel 18 in the floor raised part 18c and the reinforcing frame 12 (refer to FIGS. 1 and 2) is disposed on the upper surface of the floor panel 18 in the floor recessed part 18d and the floor inclined part 8e. An outer end portion 18f of the floor inclined part 18e is joined to the side surface 10f of the side sill 10.

Function of Vehicle Body Lower Structure

A function of the vehicle body lower structure according to the embodiment of the present disclosure will now be described with respect to a narrow offset collision between front left part of the vehicle body 1 of the vehicle C1 and the oncoming vehicle C2 with reference to FIGS. 1 to 8B.

Referring to FIGS. 8A and 8B, in the narrow offset collision between the vehicle C1 and the oncoming vehicle C2, the oncoming vehicle C2 passes the front left part of the vehicle body 1, i.e., the left end of the front bulkhead 2 and a portion outside the front side frame 3 (refer to FIG. 1) such that the front wheel house upper member 4, the front wheel house 5, the front wheel T, the front pillar 7, the front end part 10c of the side sill 10, and the jack-up reinforcement plate 13 are pressed rearward (in the direction of the collision load F1) and crushed by the oncoming vehicle C2. In particular, the front side frame 3, which is rigid, of the oncoming vehicle C2 presses the front wheel T in front of the side sill 10. The wheel rearwardly presses the front end part 10c of the side sill 10.

Referring to FIG. 3, the crush area S is disposed in the front end part 10c of the side sill 10 in order to improve the ability to absorb the collision load F1. The bulkhead 11 and the side-sill reinforcing bracket 10g are arranged inside the side sill 10 on the rear of the crush area S to increase the strength and stiffness. Furthermore, the side of the portion, where the bulkhead 11 is disposed, of the side sill 10 closer to the vehicle interior R is supported by the reinforcing frame 12, thus preventing the side sill 10 from being bent. Accordingly, the strength of the portion, in which the bulkhead 11 is disposed and which is coupled to the reinforcing frame 12, of the side sill 10 is higher than that of the crush area S on the front of the portion.

Consequently, the crush area S in the front end part 10c on the front of the portion, where the bulkhead 11 is disposed, is locally crushed by the collision load F1, thus absorbing the collision load F1 to prevent part on the rear of the portion, where the bulkhead 11 is disposed, of the side sill 10 from being deformed.

As regards the collision load F1 applied to the front end part 10c of the side sill 10, since the strength of the portion where the bulkhead 11 is disposed is high and the side sill 10 is coupled to the reinforcing frame 12 rearwardly diagonally extending from this portion, the collision load F1 is transferred and distributed to the side sill 10 and the reinforcing frame 12 and the collision load F2 distributed to the reinforcing frame 12 is transferred to the floor frame 17. In other words, the collision load F1 applied to the front end part 10c of the side sill 10 is received by the portion, where the bulkhead 11 is disposed, of the side sill 10, so that the side sill 10 is prevented from being bent.

Since the side sill 10 is not bent, therefore, the shape of a door opening above the side sill 10 on the rear of the crush area S is kept such that a front side door (not illustrated) is prevented from being difficult to open. Thus, the door is openable after collision.

Furthermore, although the crush area S in the front end part 10c of the side sill 10 is deformed by the collision load F1, part on the rear of the front end part 10c, namely, the portion of the side sill 10 where the bulkhead 10 is disposed is hard to deform. Thus, the shape of the door opening can be prevented from being deformed.

Furthermore, since the reinforcing frame 12 extends between the side sill 10 and the floor frame 17 such that one end of the reinforcing frame 12 is connected to the side sill 10 and the other end thereof is joined to the floor frame 17, the reinforcing frame 12 securely holds the floor surface 18a in the vehicle interior R. In addition, the floor panel 18 is held such that the floor surface 18a is joined to the hat-shaped cross-section floor frames 17 and the hat-shaped cross-section tunnel frame 16 as illustrated in FIGS. 6 and 7. Accordingly, vibration of the floor panel 18 is prevented.

Furthermore, the floor panel 18 joined to the dashboard lower part 6a disposed on the side of the front end part 10c of the side sill 10 closer to the vehicle interior R, as illustrated in FIGS. 3 and 4, is prevented from being separated therefrom due to the collision load F1, because the strength and impact absorbability of the side sill 10 are increased.

As described above, in the structure of the vehicle body lower part 1b according to the embodiment of the present disclosure, the crush area S in the front end of each side sill 10 improves the ability to absorb the collision load F1 applied upon narrow offset collision, each bulkhead 11 increases the strength of the portion where the bulkhead 11 is disposed on the rear of the crush area S, and each reinforcing frame 12 supporting the side of the portion, where the bulkhead 11 is disposed, of the side sill 10 closer to the vehicle interior R prevents the side sill 10 from being bent, thus facilitating deformation of the front end part 10c of each side sill 10 to improve the impact absorbability. Since the strength of the portion of the side sill 10 on the rear of the front end part 10c is increased and the portion, therefore, hardly deforms, the shape of each of right and left ends of the bottom of the vehicle interior R and opening and closing of the doors are not affected by the collision.

Modifications

The present embodiment is not limited to the foregoing embodiment and many modifications and variations are possible within the scope of technical idea of the disclosure. Thus, it is intended that the present embodiment covers the modifications and variations of the disclosure. The same components as those described above are designated by the same reference numerals and description thereof is omitted.

Figure 9A:
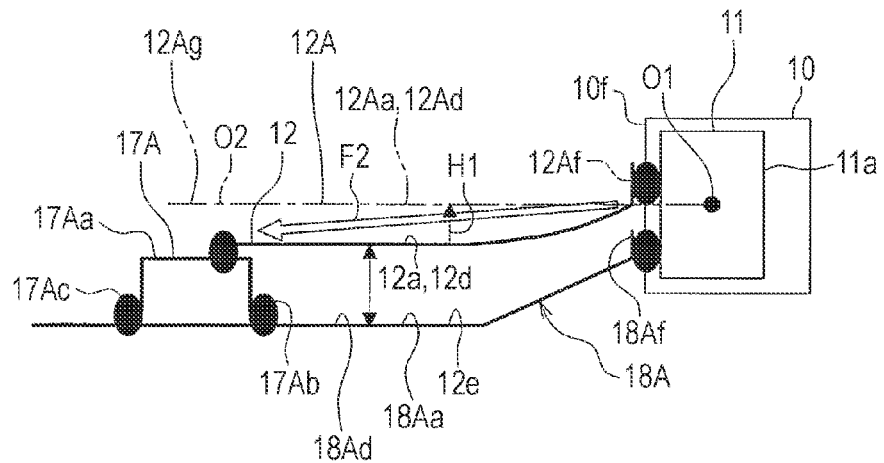
FIG. 9A is a schematic cross-sectional view of a reinforcing frame in a first modification of the embodiment.
Figure 9B:
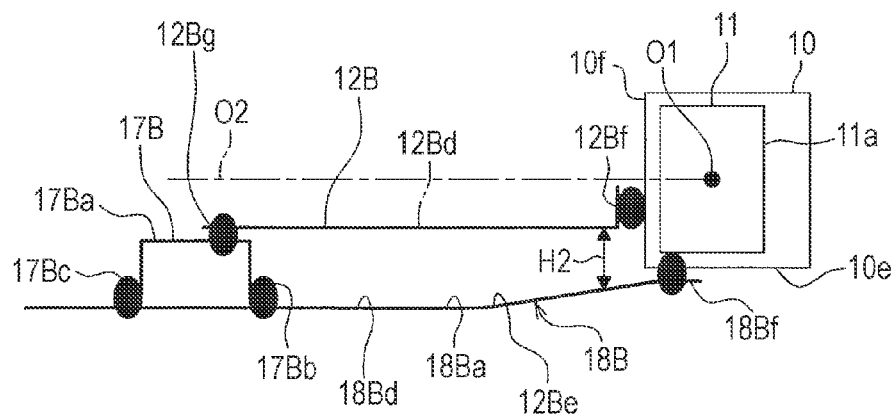
FIG. 9B is a schematic cross-sectional view of a reinforcing frame in a second modification of the embodiment.
Figure 9C:
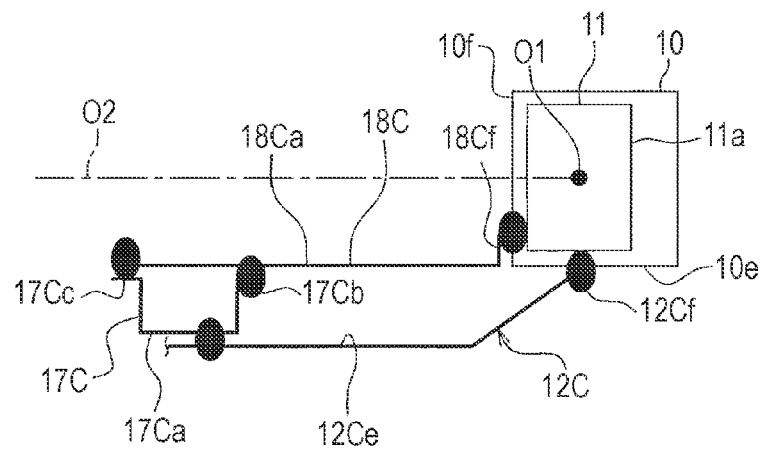
FIG. 9C is a schematic cross-sectional view of a reinforcing frame in a third modification of the embodiment.
Figure 10:
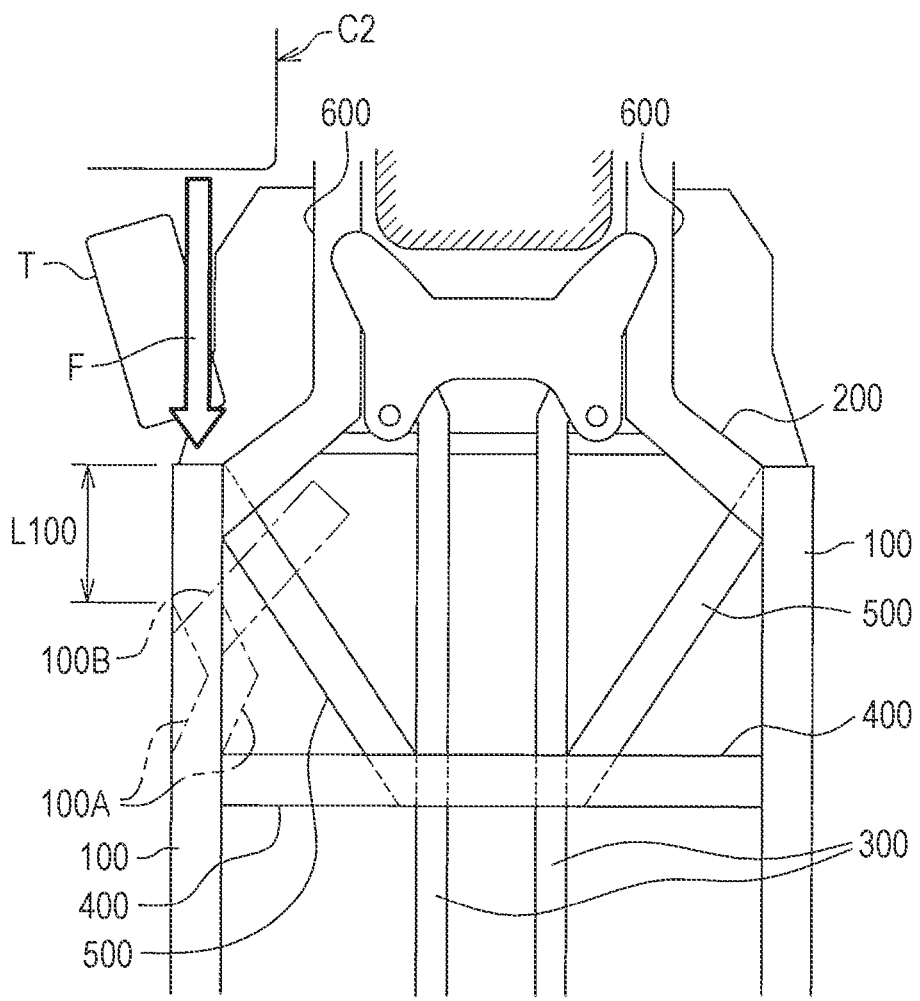
FIG. 10 is a schematic plan view of a vehicle body of a related-art vehicle, FIG. 10 illustrating a state where a collision load caused by a narrow offset collision of the vehicle is applied to the vehicle body.
Figure 11:
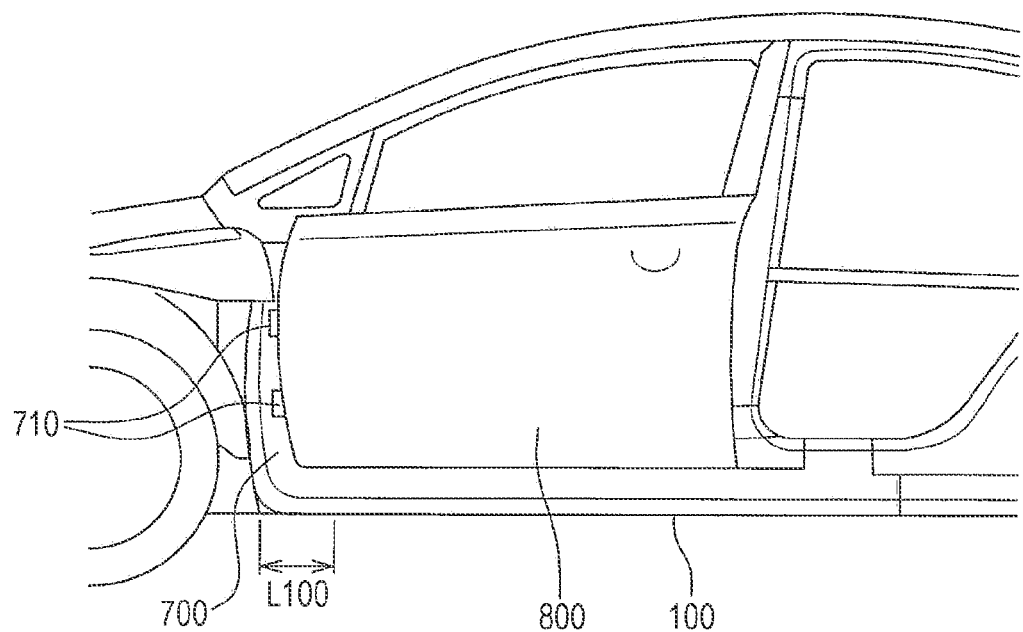
FIG. 11 is a side elevational view of part on the left of the related-art vehicle, FIG. 11 illustrating a state of a door of the vehicle after narrow offset collision.

FIGS. 9A to 9C are diagrams illustrating modifications of the vehicle body lower structure according to the foregoing embodiment. FIG. 9A is a schematic cross-sectional view of a reinforcing frame in a first modification. FIG. 9B is a schematic cross-sectional view of a reinforcing frame in a second modification. FIG. 9C is a schematic cross-sectional view of a reinforcing frame in a third modification.

First Modification

In the foregoing embodiment, each reinforcing frame 12 is disposed such that the inner joint 12g is joined to the upper surface of the floor frame 17, the outer joint 12f is joined to the outer end 18f of the floor panel 18 and the side surface 10f of the side sill 10 closer to the vehicle interior R, and the load transfer portion 12a (edge line 12d) is positioned below the cross-sectional centroid O1 of the side sill 10 as illustrated in FIG. 5. The placement is not limited to the above one.

For example, a reinforcing frame 12A may be disposed such that an approximate extension O2 of a load transfer portion 12Aa (edge line 12Ad) extends so as to pass through the cross-sectional centroid O1 of the side sill 10 as illustrated in FIG. 9A.

In this case, as illustrated in FIG. 9A, the reinforcing frame 12A is shaped such that the load transfer portion 12Aa (edge line 12Ad) of the reinforcing frame 12A is higher than the load transfer portion 12a (edge line 12d) of the reinforcing frame 12 by a distance indicated by the arrow H1 and the centroid O1 of the bulkhead 11 and the side sill 10 is positioned on the extension of a load transfer path of the load transfer portion 12Aa (edge line 12Ad) of the reinforcing frame 12A. An outer joint 12Af of the reinforcing frame 12A is joined to the side surface 10f of the side sill 10 closer to the vehicle interior R and an inner joint 12Ag thereof is joined to an upper surface 17Aa of a floor frame 17A.

In this placement, the collision load F2 applied to the side sill 10 acts straight along the edge line 12Ad, thus further allowing the edge line 12Ad (the load transfer portion 12Aa) to increase ability to transfer the collision load F1.

The load transfer portion 12Aa may be disposed on the approximate extension O2 of the load transfer path. The load transfer portion 12Aa may be disposed on the horizontal extension O2, as illustrated in FIG. 9A, or may be a portion to which the collision load F2 is applied diagonally.

In this case, the bulkhead 11 is disposed at an angle relative to the length of the side sill 10 such that the separating portion 11a coincides with the side sill 10 when viewed in plan. Alternatively, the bulkhead 11 is disposed perpendicular to the length of the side sill 10 such that part of the separating portion 11a intersects the extension line O2. In other words, it is necessary that the bulkhead 11 partly intersect the extension line O2 of the load transfer path.

Second Modification

While the foregoing embodiment has been described with respect to the case where the outer end 18f of each floor panel 18 is joined to the side surface 10f of the corresponding side sill 10 closer to the vehicle interior R as illustrated in FIG. 5, the placement is not limited to the above one.

A floor panel 18B may be joined to a lower surface 10e of the side sill 10 as illustrated in FIG. 9B. In this placement, the height, indicated at H2, of a reinforcing frame 12B between each flange 12Be near an outer joint 12Bf and an edge line 12Bd is increased, so that the cross-sectional area of the reinforcing frame 12B can be increased with increase in height. Thus, the increased strength can be provided.

Furthermore, the reinforcing frame 12B may be formed horizontally as illustrated in FIG. 9B. In this case, the outer joint 12Bf of the reinforcing frame 12B is joined to the side surface 10f of the side sill 10 closer to the vehicle interior R and an inner joint 12Bg thereof is joined to an upper surface 17Ba of the floor frame 17B. Accordingly, since the edge line 12Bg extends linearly in a manner similar to the first modification, the ability of transfer the collision load F1 can be increased.

Third Modification

A reinforcing frame 12C and a floor frame 17C may be arranged below a floor surface 18Ca of each floor panel 18C as illustrated in FIG. 9C. In this arrangement, since the floor panel 18C may be formed flat, the floor surface 18Ca can be flattened.

In this case, the floor frame 17C is joined to the floor panel 18C such that flanges 17Cb and 17Cc are placed on the upper side. The upper surface of each flange 12Ce of the reinforcing frame 12C is joined to the floor frame 17C and an outer joint 12Cf thereof is joined to the lower surface 10e of the side sill 10.

Another modification

While the foregoing embodiment has been described with respect to the case where the components are made of steel, a high stiffness material may be used. The components may be made of light alloy, such as aluminum material (aluminum alloy), or resin material.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A vehicle body lower structure comprising:
   a side sill disposed on an end of a vehicle body in a vehicle width direction so as to extend along the length of the vehicle body, the side sill including a crush area and a bulkhead, the crush area being crushable under a collision load caused by collision with a vehicle in order to absorb the collision load, the bulkhead being disposed on the rear of the crush area inside the side sill; and
   a reinforcing frame attached to a side surface of the side sill facing a vehicle interior, a first end of the reinforcing frame being joined to the side surface of the side sill facing the vehicle interior, and where the bulk head is disposed, such that the reinforcing frame extends rearwardly and inwardly in the vehicle width direction, a second end of the reinforcing being joined to a floor frame,
   wherein the side sill includes a side sill inner disposed inside the vehicle body and a side sill outer disposed on the outside of the vehicle body such that the side sill inner and the side sill outer are joined to each other, the side sill inner extends along longitudinal direction of the vehicle body and includes a substantially angular U shape in cross section comprising an upper inner surface, a side inner surface, and a lower inner surface, the upper inner surface, the side inner surface, and the lower inner surface defining a space within the side sill,
   wherein the reinforcing frame includes an edge line extending along a longitudinal direction of the reinforcing frame, the bulkhead is disposed on an extension of the edge line of the reinforcing frame in plan view, and includes a separating portion and a flange,
   wherein the separating portion extends in a direction perpendicular to the longitudinal direction of the side sill inner and partitions the space inside the side sill inner into front part and rear part, and
   wherein the flange is disposed at an edge of the separating portion to form a substantially L shape in cross section together with the separating portion and is joined to the upper inner surface, the side inner surface, and the lower inner surface.

2. The structure according to claim 1, wherein the edge line is a load transfer portion of the reinforcing frame and is a linear edge line defined by an upper surface and a side surface of the reinforcing frame,
   wherein the structure further includes a floor panel, the floor panel including a downwardly recessed interior portion and an inclined portion on the outer side of the recessed portion in the vehicle width direction, and
   wherein the reinforcing frame is joined to the recessed portion and the inclined portion.

3. The structure according to claim 2, wherein the reinforcing frame extends along a floor surface of the floor panel and
   wherein a cross-sectional centroid of the side sill is positioned on an approximate extension of the edge line of the reinforcing frame.

4. The structure according to claim 3, wherein the floor panel is coupled to a lower surface of the side sill inner.

5. The structure according to claim 1, wherein the reinforcing frame extends along a floor surface,
   wherein a floor panel forming the floor surface is coupled to a lower surface of the side sill inner, and
   wherein the floor frame and the reinforcing frame are arranged on the lower surface of the floor panel.

6. The structure according to claim 1, further comprising:
   a jack-up reinforcement plate disposed in the crush area, the jack-up reinforcement plate includes a bead extending along the height of the vehicle body such that the jack-up reinforcement plate is resistant to a load acting along the height of the vehicle body and being sensitive to a load acting along the length of the vehicle body,
   wherein the jack-up reinforcement plate is disposed in a cross section of the side sill.

* * * * *